(12) United States Patent
Pahlevaninezhad et al.

(10) Patent No.: US 9,882,389 B2
(45) Date of Patent: *Jan. 30, 2018

(54) HIGH EFFICIENCY DC/DC CONVERTER AND CONTROLLER

(71) Applicants: Majid Pahlevaninezhad, Kingston (CA); Shangzhi Pan, Kingston (CA); Praveen Jain, Kingston (CA)

(72) Inventors: Majid Pahlevaninezhad, Kingston (CA); Shangzhi Pan, Kingston (CA); Praveen Jain, Kingston (CA)

(73) Assignee: SPARQ SYSTEMS INC., Kingston, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/198,804

(22) Filed: Jun. 30, 2016

(65) Prior Publication Data

US 2016/0365732 A1 Dec. 15, 2016

Related U.S. Application Data

(63) Continuation of application No. 14/550,487, filed on Nov. 21, 2014, now Pat. No. 9,461,553.

(Continued)

(51) Int. Cl.
*H02M 3/335* (2006.01)
*H02J 3/38* (2006.01)
(Continued)

(52) U.S. Cl.
CPC ......... *H02J 3/383* (2013.01); *H02M 3/33507* (2013.01); *H02M 3/33569* (2013.01); *H02M 1/083* (2013.01); *H02M 3/337* (2013.01); *H02M 2001/007* (2013.01); *H02M 2001/0058* (2013.01); *Y02B 70/1491* (2013.01); *Y02E 10/563* (2013.01)

(58) Field of Classification Search
CPC ..... H02M 2001/0058; H02M 3/33507; H02M 3/33569; H02M 3/337; H02M 2001/007; H02J 3/383
See application file for complete search history.

(56) References Cited

U.S. PATENT DOCUMENTS

2005/0180175 A1   8/2005 Torrey et al.
2010/0097005 A1*  4/2010 Kyrberg ............ H05B 41/2806
                                                      315/279

(Continued)

*Primary Examiner* — Fred E Finch, III
*Assistant Examiner* — Rafael O De Leon Domenech
(74) *Attorney, Agent, or Firm* — Brion Raffoul

(57) ABSTRACT

Systems, methods, and devices for use in a DC/DC converter. A circuit uses a full-bridge power semiconductor subcircuit along with a high power transformer subcircuit, a diode bridge subcircuit, and a parallel capacitor to provide galvanic isolation and boost the voltage from a power source such as a photovoltaic panel. To ensure zero voltage switching for the power semiconductors, either a passive auxiliary subcircuit or an inductor coupled in parallel to a transformer in the transformer subcircuit may be used. A controller which derives its timing signals from the transformer primary current is used to control the timing of the power semiconductors in the circuit. The circuit and its controller allows for self-adjusting regardless of load and uses the entire switching cycle to be used for power transfer.

8 Claims, 14 Drawing Sheets

Related U.S. Application Data

(60) Provisional application No. 61/907,099, filed on Nov. 21, 2013.

(51) Int. Cl.
 *H02M 1/08* (2006.01)
 *H02M 3/337* (2006.01)
 *H02M 1/00* (2006.01)

(56) References Cited

U.S. PATENT DOCUMENTS

| | | | |
|---|---|---|---|
| 2011/0026282 A1* | 2/2011 | Chapman | H02J 3/38 363/65 |
| 2011/0299301 A1 | 12/2011 | Huang | |
| 2012/0063184 A1* | 3/2012 | Mazumder | H02M 7/4807 363/98 |
| 2013/0223103 A1* | 8/2013 | Pahlevaninezhad | H02M 3/337 363/17 |
| 2013/0235631 A1 | 9/2013 | Pahlevaninezhad et al. | |

* cited by examiner

HIGH EFFICIENCY DC/DC CONVERTER AND CONTROLLER

RELATED APPLICATIONS

This application is a Continuation of U.S. patent application Ser. No. 14/550,487 filed Nov. 21, 2014, which claims the benefit of U.S. Provisional Application No. 61/907,099 filed on Nov. 21, 2013.

TECHNICAL FIELD

The present invention relates to topologies and control systems for DC/DC converters. More specifically, this invention relates to the DC/DC converters used in photovoltaic (PV) power conditioning systems.

BACKGROUND

Existing centralized power generation systems are not able to provide a sustainable solution for the growing energy demands. Centralized power generation systems are very costly, require maintenance and lack reliability. They also significantly contribute to environmental pollution by having harmful emissions. Renewable energy in the form of decentralized power generation systems is a very promising solution to the world energy crisis. Soon localized renewable energy power generation systems will be responsible for providing energy to the end-users.

Photovoltaic (PV) power generation systems offer a very clean and practical energy source. PV power conditioning systems extract the power from the PV panel and deliver the power to the utility grid and local loads. The main challenges to the more widespread acceptance of PV power conditioning systems are efficiency, reliability and robustness. PV power systems should be able to efficiently deliver power from the PV panel to the grid and local loads under different operating conditions.

A PV power conditioning system, usually, consists of two stages. The first stage is a DC/DC converter. The DC/DC converter is responsible for boosting the voltage at the output of the PV panel and for providing galvanic isolation as required by regulatory standards. This stage is also responsible for extracting the maximum power from the PV panel and for delivering this power to an intermediate DC-link. The second stage is usually a conventional DC/AC inverter. The DC/AC converter converts the DC power to AC power which is deliverable to the utility grid.

One of the main challenges of the first stage is that of processing the power very efficiently. Thus, the efficiency of the DC/DC converter is of great importance. Another main challenge is that of quickly tracking the maximum power produced by the PV panel. A further main challenge is that of reliability. The DC/DC converter should operate very robustly for a wide range of operational conditions due to erratic weather.

Switching losses greatly contribute to the overall losses of the DC/DC converter. Soft-switching techniques are able to significantly attenuate switching losses. Therefore, soft-switching is necessary to achieve good efficiency in DC/DC converters. Soft-switching is realized when either the voltage across the power semiconductor or the current flowing through the power semiconductor is zero during the switching transitions. Because of this, zero voltage switching (ZVS) and zero current switching (ZCS) are among the soft-switching techniques used to improve the efficiency of the DC/DC converter. In conventional full-bridge PWM (pulse width modulation) converters, ZVS is achieved by using the energy stored in the leakage inductance to charge and discharge the output capacitances of the MOSFETs in the circuit. Because of this, the range of ZVS operation is highly dependent on the load and on the transformer leakage inductance. This dependence is one of the main limitations of the conventional full-bridge converter. Conventional full-bridge converters are not able to ensure ZVS operation for a wide range of load variations as the range of ZVS operation is dependent on the load and the transformer leakage inductance.

Another difficulty related to the conventional full-bridge phase-shift DC/DC converter is the performance of the output diodes. The interaction between the leakage inductance of the transformer in the converter and the output filter in the converter significantly degrades the performance of the output diodes. This interaction causes very high voltage spikes across the output diodes as well as lossy commutations of the output diodes. These lead to duty cycle loss and significant oscillatory current in the primary side of the transformer. These problems are intensified when the switching frequency of the converter increases. Because of these issues, the conventional full-bridge phase-shift DC/DC converter topology does provide good efficiency and performance for PV power conditioning systems. That being said, there are a number of references which propose solutions for improving the performance of the output diodes. While some of these proposed techniques mitigate the issues pertaining to the output diodes in conventional full-bridge converters, these solutions require extra active and passive components. These requirements significantly offset whatever advantages these solutions may offer.

Resonant converters are able to provide soft-switching while also achieving good efficiency. The operational range for resonant converter should, however, be extended. Generally, in order to extend the range of soft-switching in resonant converters, the resonant circuit should be designed such that there is enough circulating current in the resonant circuit. This, however, compromises the performance of the resonant converter and results in a lower efficiency due to extra losses caused by the circulating current. In addition to this issue, a significant amount of current ripple passes through the resonant components in this application. Because of these problems, resonant circuits are usually bulky and, as such, any power conditioning system using resonant converters will have its power density compromised.

Because of the above shortcomings of the prior art, there is a need for topologies and circuits which can be used in the first-stage DC/DC converter as a part of a two-stage power conditioning system.

SUMMARY

The present invention provides systems, methods, and devices for use in a DC/DC converter. A circuit uses a full-bridge power semiconductor subcircuit along with a high power transformer subcircuit, a diode bridge subcircuit, and a parallel capacitor to provide galvanic isolation and boost the voltage from a power source such as a photovoltaic panel. To ensure zero voltage switching for the power semiconductors, either a passive auxiliary subcircuit or an inductor coupled in parallel to a transformer in the transformer subcircuit may be used. A controller which derives its timing signals from the transformer primary current is used to control the timing of the power semiconductors in the circuit. The circuit and its controller allow for self-adjusting regardless of load and uses the entire switching cycle to be used for power transfer.

In a first aspect, the present invention provides a circuit for use as a DC/DC converter, the circuit comprising:
- a full-bridge subcircuit coupled in parallel to an input, said full-bridge subcircuit including a plurality of power semiconductors arranged in a bridge configuration;
- a high frequency transformer subcircuit coupled to said full-bridge subcircuit;
- a diode bridge subcircuit coupled to said transformer subcircuit;
- a parallel capacitor coupled in parallel to said diode bridge subcircuit;
- a subcircuit for providing reactive current for said power semiconductors for zero voltage switching of said semiconductors;

wherein
said parallel capacitor is coupled to an output of said converter.

In a second aspect, the present invention provides a controller for controlling a DC/DC converter circuit, said controller comprising:
- a modulator for producing control signals for power semiconductors in said converter circuit;
- a subcontroller for providing a timing signal to said modulator;

wherein
both said subcontroller and said modulator receive as input a version of a transformer primary current from a transformer in said converter circuit; and
said subcontroller receives as input an output of a maximum power point tracking module coupled to an input power source.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In order to overcome the shortcomings of previously proposed DC/DC converters, the present invention provides topologies in conjunction with control methods for the DC/DC converter designed for use in PV power conditioning systems. The present invention uses two current-driven full-bridge DC/DC converter topologies, each of which is able to significantly improve the efficiency, power density performance, and robustness of the DC/DC converter.

The first topology is based on a current-driven rectifier that can greatly mitigate the difficulties encountered when using conventional full-bridge DC/DC converters. This topology eliminates the voltage spikes across the output diodes and also eliminates the reverse recovery losses of the output diode as well as the lossy free-wheeling operation of the output diodes. In addition, this topology provides soft-switching regardless of the load condition. Due to these characteristics, the topology is highly efficient when in operation The first topology according to the present invention provides a peak current mode self-sustained oscillating controller (PCM-SSOC) for the current-driven full-bridge DC/DC converter. This ensures the full utilization of each switching cycle to transfer the power. In particular, this guarantees that the transformer output voltage and the output current remain in phase with each other at different operating conditions. Power is thereby delivered very efficiently to the output. The PCM-SSOC technique uses the transformer primary current as a timing signal to produce the gate pulses for the converter. By doing this, the control system is completely insensitive to any parameter uncertainties and the control system automatically compensates for any uncertainties by way of the timing signal. This provides for a very robust and reliable operation for the DC/DC converter.

The current-driven full-bridge DC/DC converter of one aspect of the invention uses a passive auxiliary circuit to provide for the ZVS condition for the leading-leg of the full-bridge converter. The second topology according to another aspect of the present invention uses a series-parallel current-driven full-bridge DC/DC converter in order to eliminate the need for the auxiliary circuit. The series-parallel current-driven topology utilizes the magnetizing inductance of the transformer as a parallel inductive path in order to guarantee soft-switching for the power semiconductors in the circuit. This allows for a very high power density in the circuit. Also provided in this aspect of the invention is a modified PCM-SSOC control technique which ensures optimal operation of the series-parallel current-driven full-bridge DC/DC converter.

Figure 1:
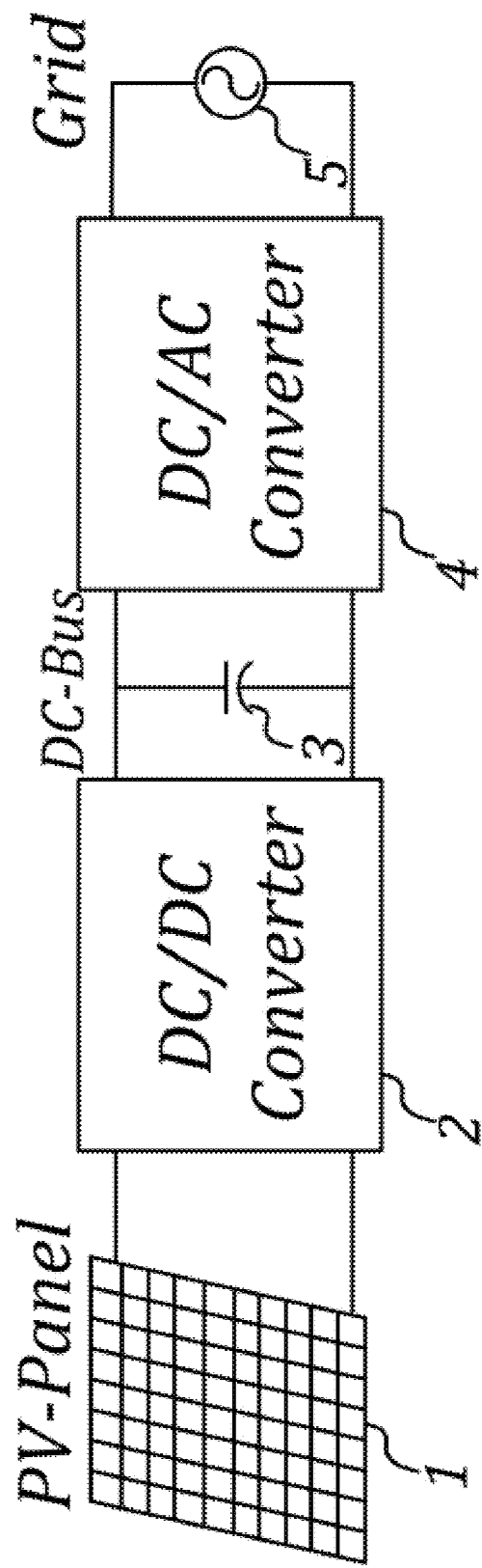
FIG. 1 illustrates a two-stage PV power conditioning system.

The present invention provides circuits along with control methods for a DC/DC converter used as a first stage of a two-stage PV power conditioning system. The circuit in FIG. 1 shows an exemplary arrangement of a two-stage PV power conditioning system. Referring to FIG. 1, illustrated are: a PV-panel 1, a DC/Dc converter 2, a DC-link 3, a DC/AC converter 4, and a utility grid 5. The DC/DC converter 2 is responsible for providing galvanic isolation, boosting the voltage, and extracting the maximum power from the PV-panel 1. Also present is an intermediate DC-link 3 between the two stages of the power conditioning system. This component is used so that energy can be stored, decoupling between the first-stage and the second-stage can be provided, and to attenuate the double frequency ripple caused by the power ripple at the output of second-stage DC/AC converter 4. The DC/AC converter 4 produces power compatible to the utility grid 5.

Figure 2:
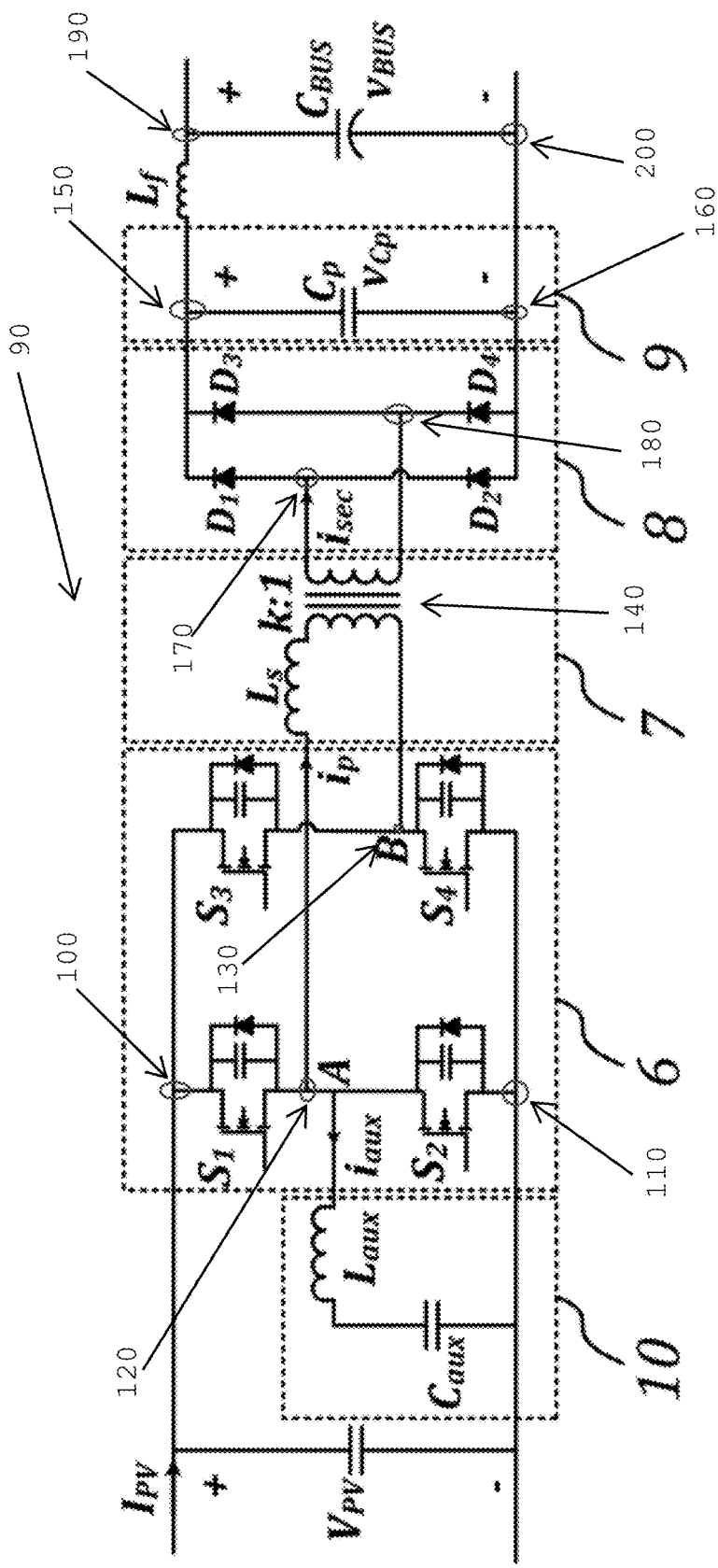
FIG. 2 is a circuit diagram of a current-driven full bridge converter according to one aspect of the invention.

The arrangement in FIG. 2 shows an exemplary arrangement of the current-driven full-bridge converter according to one aspect of the invention. In FIG. 2, there are the following circuit blocks: a full-bridge subcircuit 6, a high frequency transformer subcircuit 7, a diode bridge subcircuit 8, a parallel capacitor 9, and an auxiliary circuit 10. This converter includes a series inductor, $L_s$, as part of the high frequency transformer subcircuit. This series inductor is for converting the voltage pulses into the current pulses. The parallel capacitor, $C_p$, at the output of the diode rectifier is for filtering out the current pulses and for producing a smooth current at the output. The full-bridge converter circuit in FIG. 2 converts the DC-bus voltage to a high frequency quasi-square wave voltage. The series inductor, in series with the transformer in the transformer subcircuit 7, acts as a current source for a current-driven rectifier. The current-driven rectifier rectifies the output current of the transformer and transfers power to the output.

It can be seen from FIG. 2 that the full DC-DC converter circuit 90 is coupled to the PV-panel by way of connection points 100, 110 and that the full bridge subcircuit 6 is coupled between these same connection points 100, 110. The first leg of the full bridge subcircuit has power semiconductors $S_1$ and $S_2$ in series with each other while the second leg has power semiconductors $S_3$ and $S_4$, again in series with each other. The first and second legs are in parallel with one another. The output of the first leg is tapped from connection point 120 which is located between power semiconductors $S_1$ and $S_2$. The output from the second leg is tapped from connection point 130 and is located between power semiconductors $S_3$ and $S_4$. The output from the first leg is tapped to couple with the auxiliary circuit 10.

The auxiliary circuit 10 has an auxiliary inductor $L_{aux}$ in series with an auxiliary capacity $C_{aux}$. The auxiliary current $i_{aux}$ is tapped from the connection point 120 to be fed to the auxiliary inductor. As can be seen, the auxiliary circuit 10 is coupled between connection point 120 and connection point 110.

The high frequency transformer subcircuit 7 is coupled between connection point 120 and connection point 130. The subcircuit 7 has the series inductor $L_S$ in series with the transformer 140 and the series inductor receives the primary transformer current $i_p$ from connection point 120.

The diode subcircuit 8 is coupled between connection point 150 and connection point 160. A first diode leg has diode $D_1$ and diode $D_2$ in series with each other while the second diode leg has diode $D_3$ in series with diode $D_4$. Of course, the first diode leg is in parallel with the second diode leg. The diode subcircuit is coupled, at connection point 170 (between diodes $D_1$ and $D_2$) and connection point 180 (between diodes $D_3$ and $D_4$) to the transformer subcircuit 7. The diode subcircuit 8 receives the secondary current $i_{sec}$ from the transformer subcircuit by way of connection point 170.

In parallel to the diode subcircuit 8 by way of connection points 150, 160 is the parallel capacitor $C_p$. The whole DC/DC converter circuit couples to the DC-link (or DC-Bus) by way of connection point 190 and connection point 200. Between connection point 190 and connection point 150 is an inductor $L_f$. The inductor $L_f$ is an output filter which smooths out the output current.

Figure 3:
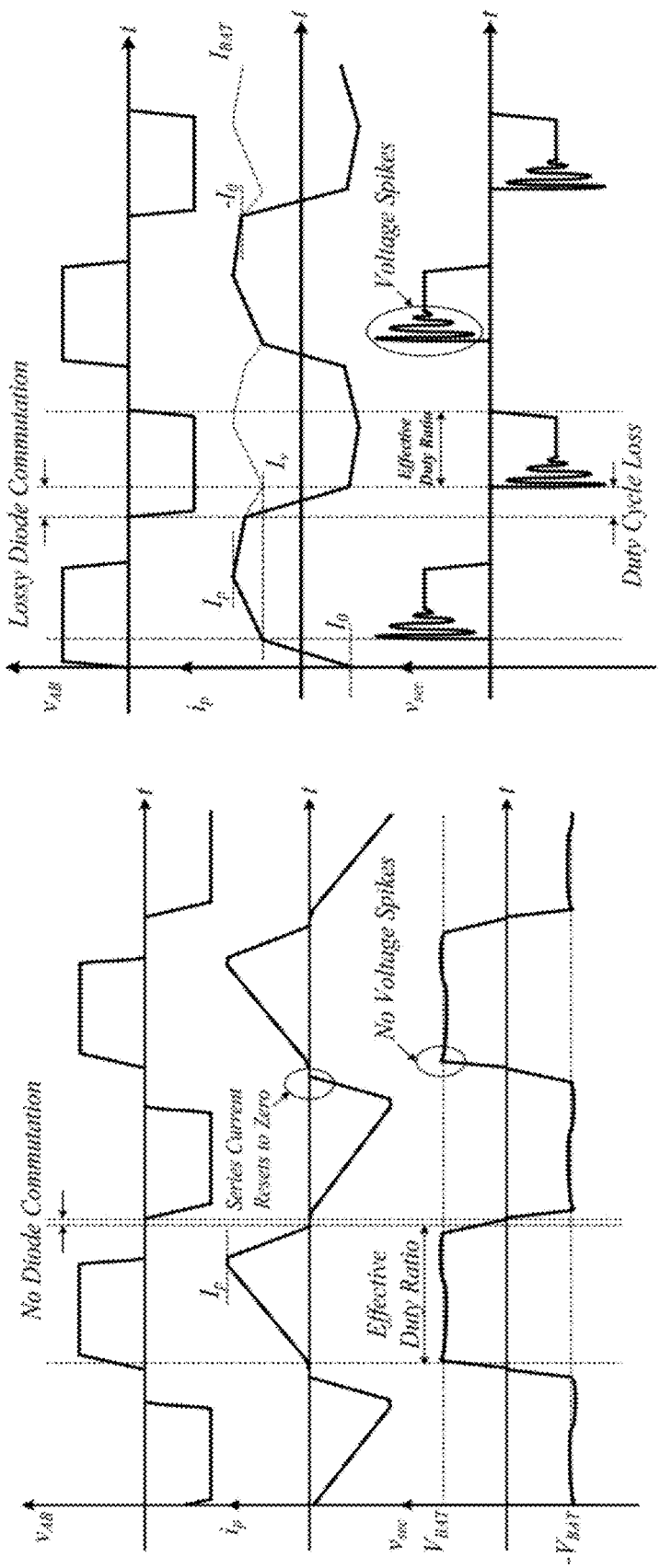
FIG. 3 are waveforms for the current-driven full bridge converter in FIG. 2 and for a conventional converter.

In order to clarify the differences in operating principles between a conventional full-bridge converter and the current-driven full-bridge converter illustrated in FIG. 2, some key waveforms of the two converters are compared in FIG. 3. As can be seen from FIG. 3, the current-driven full-bridge converter does not produce voltage spikes across the output diodes and the effective duty ratio for this circuit is higher than for the conventional circuit. As can further be seen from FIG. 3, the novel current driven full-bridge converter circuit has no diode commutation when compared to the conventional circuit. However, it should be noted that, for the current-driven circuit, the energy of the series inductance completely resets at each half switching cycle (see note in FIG. 3). This flexibility allows for the optimization of the energy transfer during the entire switching cycle.

Further to the above, FIG. 3 shows that there is a duty cycle loss due to the commutation of the output diodes in the conventional full-bridge converter. This phenomenon is intensified when the load increases. In particular, at heavy loads, a considerable portion of the duty cycle may be lost. The transformer secondary voltage waveform ($v_{sec}$), in FIG. 3, clearly shows the duty cycle loss in the conventional full-bridge converter. In contrast, for the current-driven full-bridge circuit, there is no duty cycle loss and, thus, the entire switching cycle can be used to transfer the power to the output. This can be clearly seen from the transformer secondary voltage waveform for the current-driven full-bridge converter. Since the current of the leading-leg (including power semiconductors $S_1$ and $S_2$) starts from zero, a passive auxiliary circuit 10 is used to provide reactive current to guarantee ZVS. The auxiliary inductor $L_{aux}$ should be designed such that the output capacitors of the power semiconductors in the leading-leg are completely discharged prior to the rising edge of the gate pulses for the semiconductors. By doing this, ZVS is achieved for the power semiconductors at turn-on time.

The present invention also provides for controlling the converter such that the entire switching cycle is utilized to transfer the power. In conventional control systems, the controller adjusts the phase-shift between the pulses of each leg with a fixed switching frequency in order to regulate the input/output. In the conventional control scheme, the converter only utilizes the entire switching cycle (for processing power) when the load is at a maximum. Even for heavy loads, the converter does not exploit the entire switching cycle to deliver power. As well, if a conventional control scheme is used, the converter may enter into continuous mode due to parameter uncertainties (especially uncertainties in the series inductor). Entering into continuous mode will cause the converter to lose the main advantages of the current-driven topology, such as zero reverse recovery losses of the output diodes. The converter's system parameters are subject to different and mostly uncontrollable factors such as operating frequency, temperature, ageing, etc. Since these factors affect the value of components such as series inductance, their uncontrollabiliy introduces uncertainties for conventional control systems. Efficient and reliable operation of the current-driven full-bridge converter is, therefore, unachievable under a conventional control scheme because of these uncertainties.

In order to take advantage of the entire switching cycle, the transformer secondary voltage in the current-driven full bridge converter should be very close to a square waveform. To achieve this, the inverter voltage should be applied to the primary side as soon as the output diodes turn off. With this in mind, the timing signal can be produced from the primary side current through a self-sustained oscillating loop to thereby exploit the entire cycle.

The advantages of such a self-oscillating loop is two-fold. First, with the self-oscillating loop, the transformer output voltage and current are in phase. This allows for the utilization of the entire switching cycle for transferring power. Second, the self-oscillating loop renders the control system completely insensitive to any parameter uncertainties as the self-oscillating loop compensates for any uncertainties through the timing signal.

Figure 4:
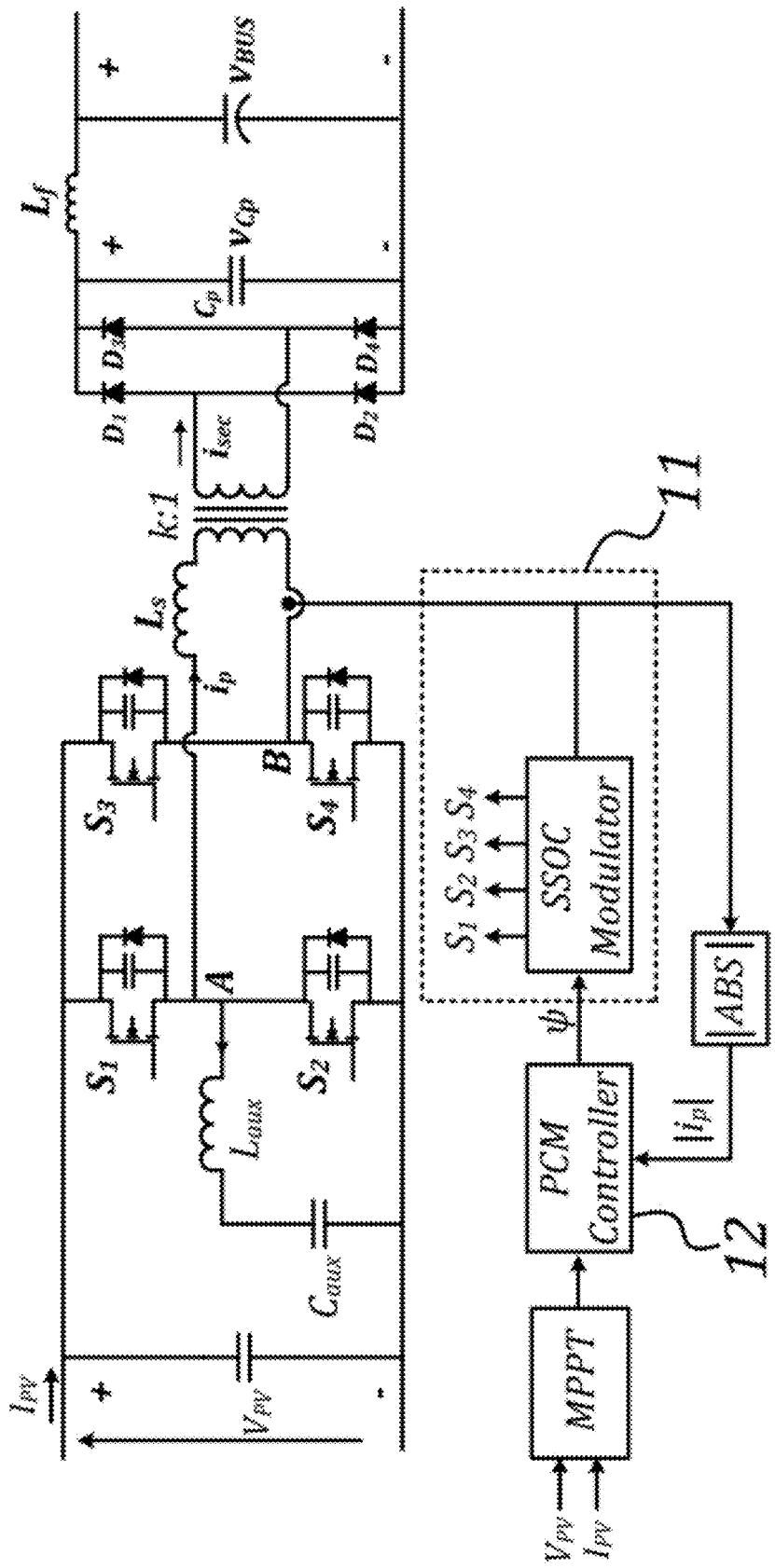
FIG. 4 is a diagram of the converter in FIG. 2 controlled by a peak current mode self-sustained oscillating controller.

In the control scheme described above, the inverter output voltage is produced based on the transformer primary current waveform. The arrangement in FIG. 4 shows an implementation of the PCM-SSOC (peak current mode self-sustained oscillating controller) technique that forms part of the present invention. As can be seen in FIG. 4, the SSOC Loop 11, produces the gate pulses for the power semiconductors based on the transformer primary current ($i_p$) tapped from the transformer. In contrast, in a conventional phase-shift control method, the gate pulses for the power semiconductors are produced based on an external oscillator. Using a control loop with the modulator provides a significant advantage as it eliminates the modulator's sensitivity to any uncertainties present in the converter. The loop allows the modulator to adaptively change the gate pulses according to the operating condition.

It should be noted that the SSOC modulator in the loop 11, the PCM subcontroller 12, the absolute value transform, and the MPPT module in FIG. 4 form a controller that controls the behavior of the converter. As can be seen from FIG. 4, the PCM subcontroller provides a timing signal $\psi$ to the modulator. As will be explained below, this signal provides a clocking signal for two of the power semiconductors in the full-bridge subcircuit.

Figure 5:
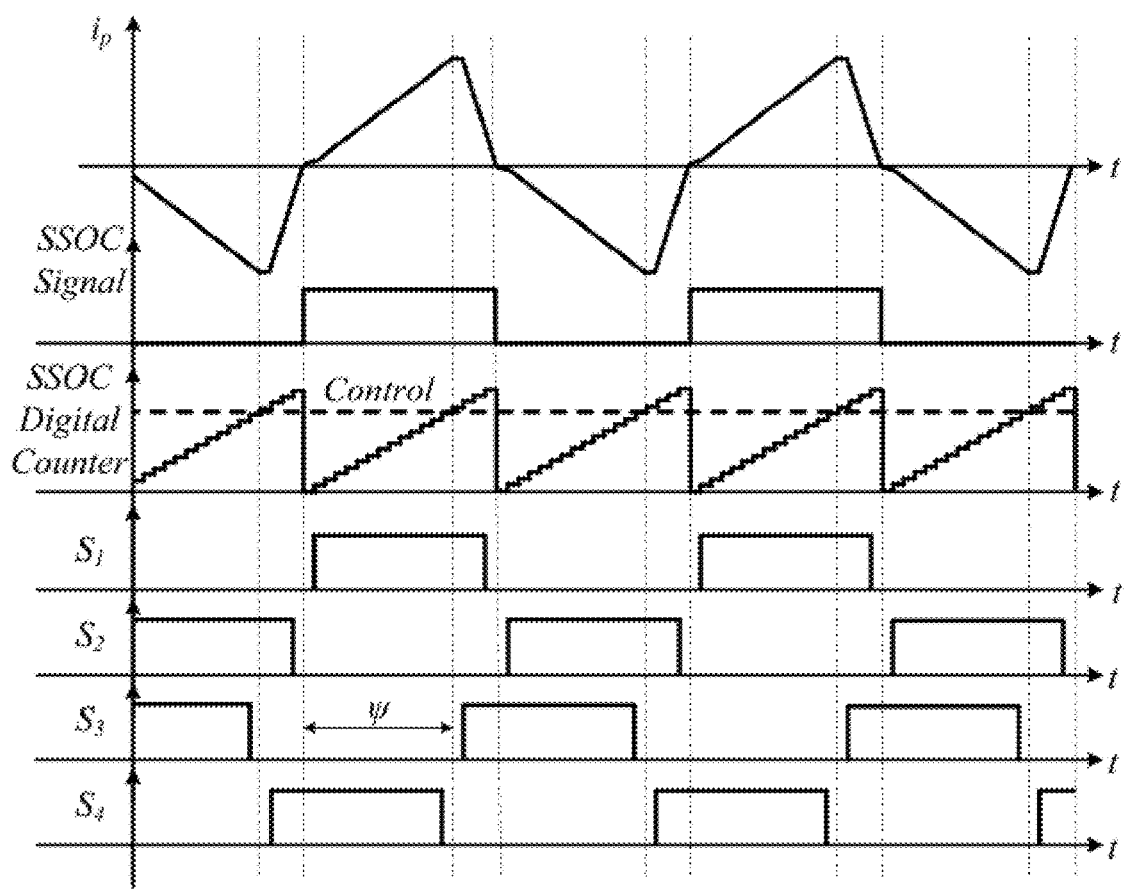
FIG. 5 are waveforms which illustrate the principles and advantages of the controller in FIG. 4.

The operating principles of the SSOC Loop 11, are explained with reference to the waveforms in FIG. 5. From FIG. 5, it can be seen that the SSOC timing signal is produced based on the transformer primary current. This primary current is fed back to the modulator by way of the PCM subcontroller 12. The SSOC digital counter is synchronized to this primary current signal. The gate signals for the leading-leg power semiconductors are produced according to the SSOC digital counter. The gate signals for the lagging-leg power semiconductors are generated according to the control signal from the PCM subcontroller 12. These control signals for the lagging-leg power semiconductors are synchronized with the SSOC timing signal. This control scheme is particularly beneficial for converters as it can prevent transformer saturation and can eliminate the need for a DC-blocking capacitor in the primary side of the transformer. One of the main advantages of this PCM-SSOC technique is that the control system has a self-tuning capability—control parameters are automatically adjusted based on the system's operating condition.

Figure 6:
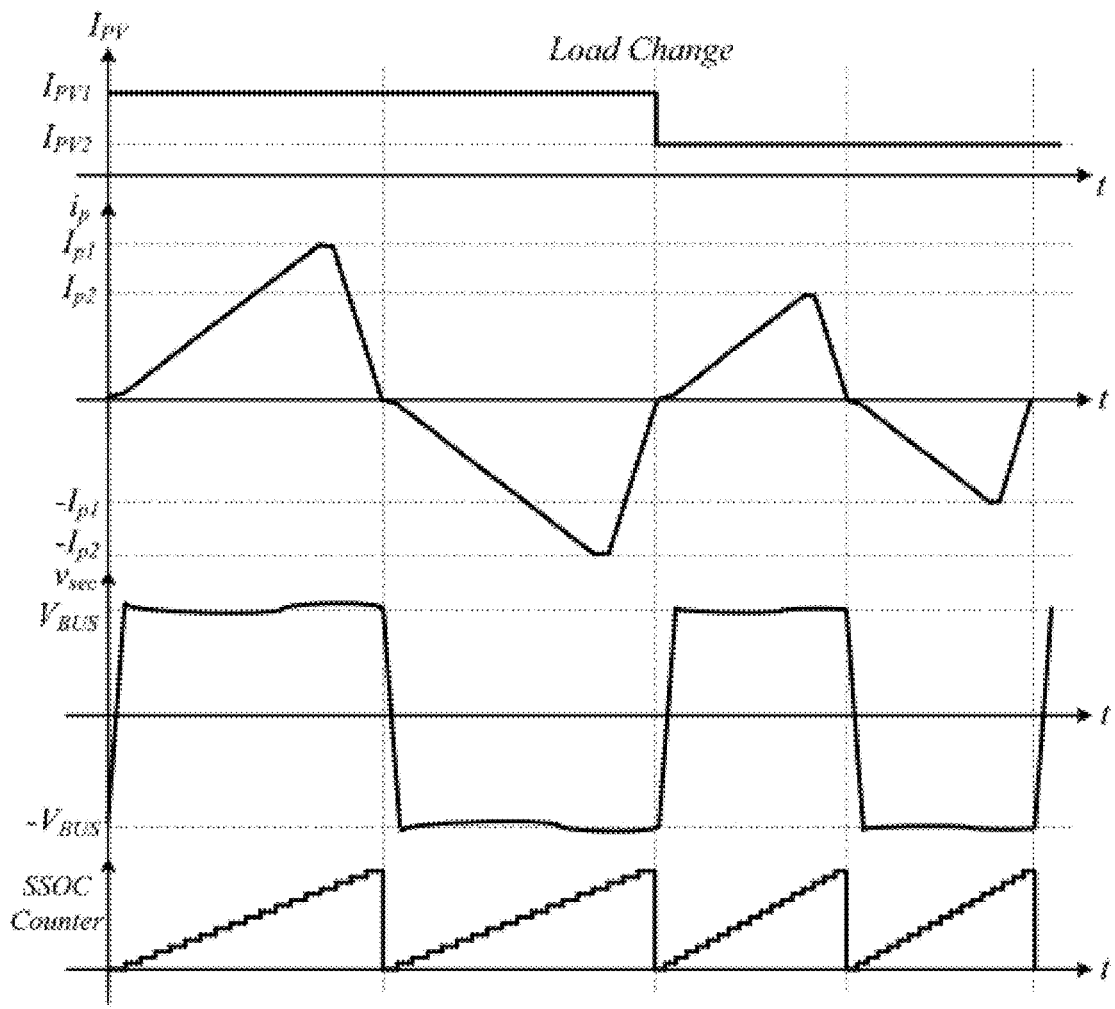
FIG. 6 are waveforms which show how the modulator used in the controller in FIG. 4 adjusts when the load is changed.

Referring to FIG. 6, the waveforms in FIG. 6 show how the SSOC modulator adjusts when the load is changed. As can be seen in FIG. 6, the SSOC timing signal (as shown by the SSOC digital counter waveform) is tuned based on the transformer primary current $i_p$. As the load changes, the transformer primary current adjusts from a first level ($I_{p1}$) to a second level ($I_{p2}$). In actuality, this primary current signal determines the specific phase-shift and the switching frequency for the particular operating condition, thereby automatically setting the phase-shift and switching frequency of the entire system. It can be seen from FIG. 6 that the converter utilizes the entire switching cycle to transfer the power for all operating conditions. As well, it can also be seen that the secondary voltage ($v_{sec}$) and transformer primary current ($i_p$) are in phase. Because of this, there is no circulating current in the converter. It should therefore be clear that the PCM-SSOC control scheme detailed above retains the converter's optimum operating point for all operating conditions, and that the control scheme is particularly tailored for applications with a wide operational range.

Figure 7:
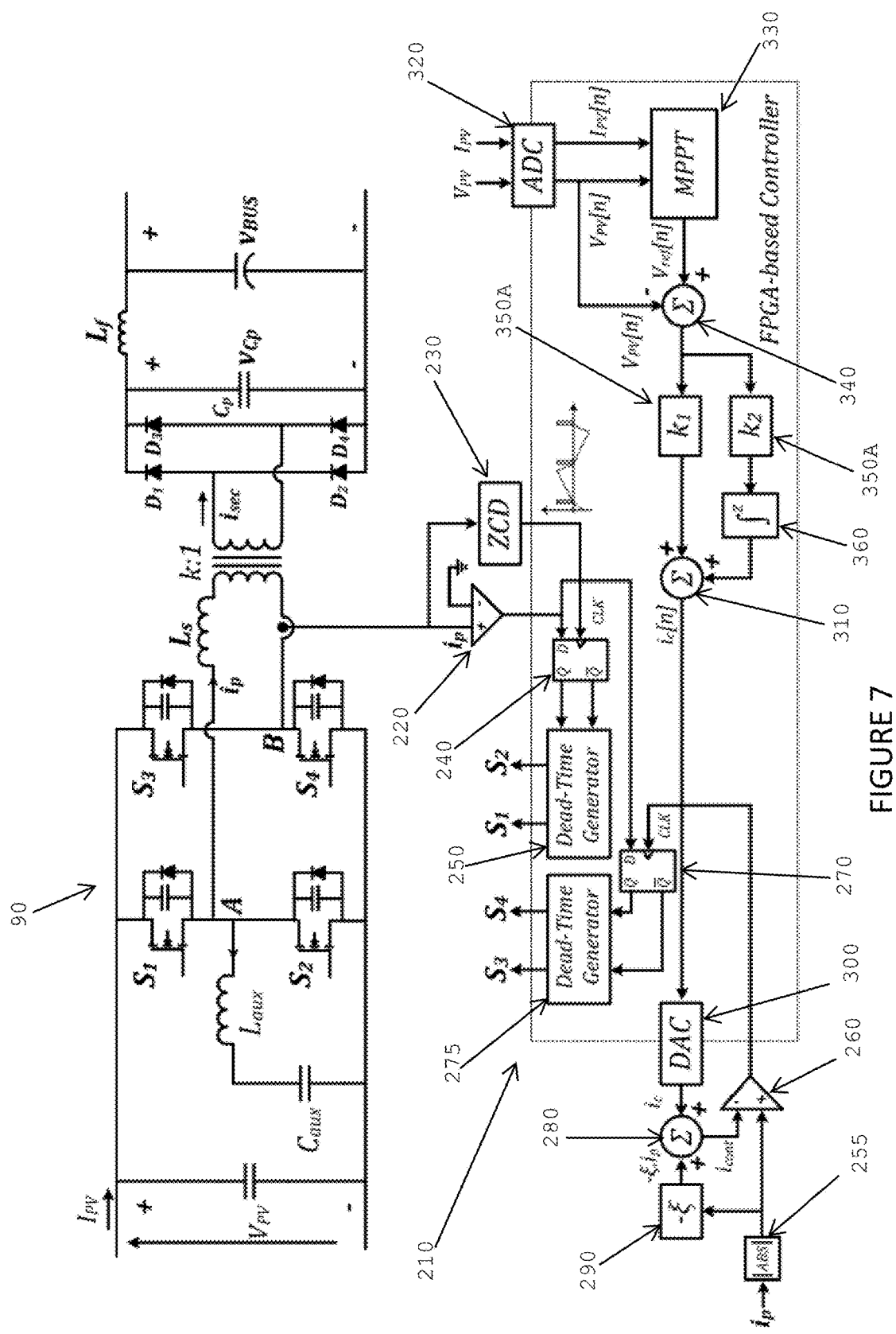
FIG. 7 is a block diagram illustrating the components for the controller shown in FIG. 4.

In terms of implementation, the block diagram of FIG. 7 illustrates the components of the PCM-SSOC control system explained above. One input to the controller 210 that controls the DC-DC converter circuit 90 is the primary transformer current $i_p$ and that this input is fed into the controller at two points. At the first feed point, this transformer current is sent in parallel to an operational amplifier 220 and a zero crossing detector (ZCD) 230. The output of the operational amplifier 220 is sent to the D input of a D flip-flop 240. The output of the ZCD 230 is sent as the clock input to the D flip-flop 240. The Q and negated Q outputs of the D flip-flop 240 act as inputs to the dead-time generator 250. The output of this dead-time generator 250 are the control or gate signals for power semiconductors $S_1$ and $S_2$.

The primary transformer current $i_p$ is first passed through an absolute value converter 255 and then is sent as input to another operational amplifier 260 and the output of this operational amplifier 260 is the clock input to another D flip-flop 270. The D input to this D flip-flop 270 is received from the output of the first operational amplifier 220. The Q and negated Q outputs of the D flip-flop 270 act as inputs to the dead-time generator 275. The output of this dead-time generator 275 are the control or gate signals for power semiconductors $S_3$ and $S_4$.

It should be noted that the other input to the second operational amplifier 260 is the output of an adder block 280. The adder block 280 sums the PCM subcontroller input $i_c$ and the result of a transform block 290 which takes as its input the output of the absolute value converter 255. The PCM subcontroller input $i_c$ is the output of a digital-analog converter (DAC) 300.

The input to the digital-analog converter (DAC) 300 is the output of the adder 310 which adds the result of transformed current and voltage values from the PV panel. The voltage and current values from the PV panel are inputs to an analog-digital converter (ADC) 320 and their digitized values are sent to a maximum power point tracking (MPPT) module 330. The output of the MPPT module has subtracted from it the corresponding digitized voltage value from the ADC 320 by way of adder 340. The result of the subtraction is fed to two multipliers 350A, 350B that multiply the value by specific constants $k_1$ and $k_2$ respectively. The result of multiplier 350B is fed to another block 360 that integrates the result and sends its output to the adder 310. The output of multiplier 350A is also sent to the adder 310.

The PCM subcontroller output, $i_c$, is calculated based on the error between the PV voltage and the reference voltage which is the output of the MPPT (maximum power point tracking) module. According to FIG. 7, the transformer primary current $i_p$ creates the timing signal for the SSOC modulator. The gate pulses for the power semiconductors $S_1$ and $S_2$ are therefore synchronous to this timing signal. FIG. 7 also shows that the SSOC-PCM control system consists of a digital part and an analog part. The digital part includes the calculations for the peak value of the current as well as the implementation of the SSOC modulator. The analog part consists of some comparators and an analog adder to superimpose the artificial ramp on top of the peak value of the current for stability purposes. The SSOC-PCM control scheme regulates the input voltage of the converter and, in turn, ensures the maximum power point tracking of the PV panel. This control scheme thus adaptively controls both the phase-shift and switching frequency in order to regulate the input voltage and to minimize the circulating current.

Figure 8:
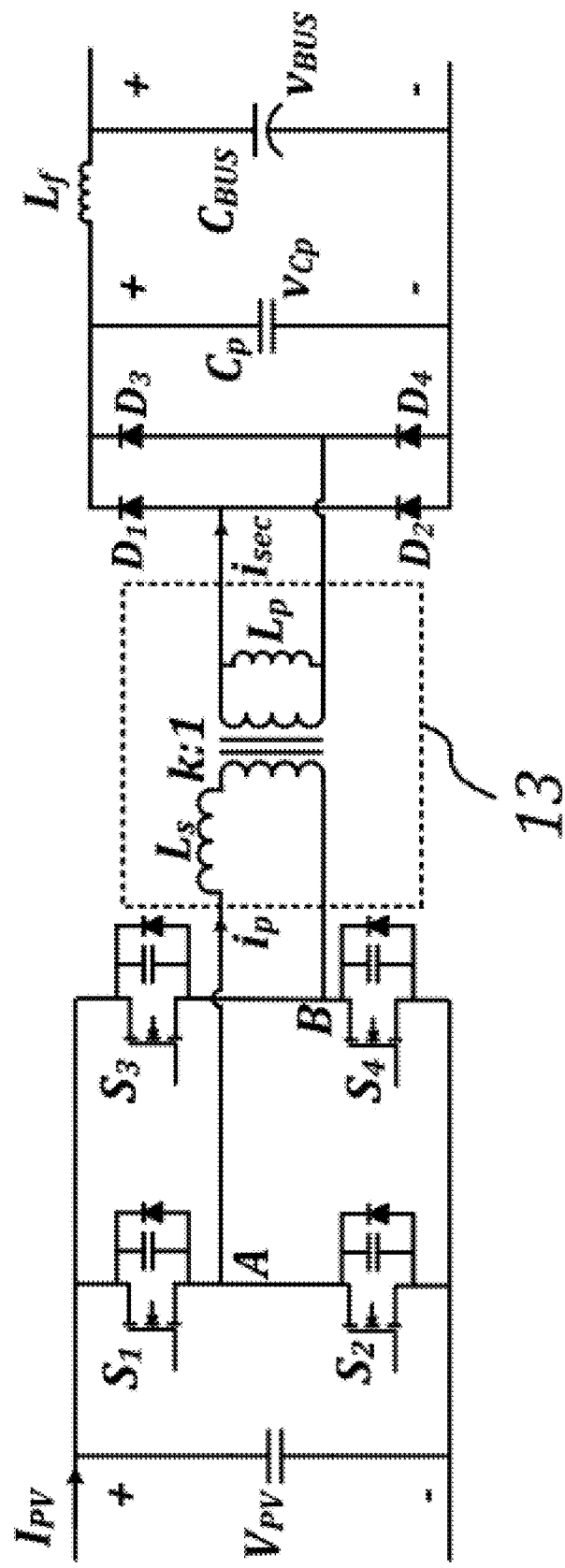
FIG. 8 is a circuit diagram illustrating a series-parallel variant of the current-driven converter according to another aspect of the invention.

In another aspect, the present invention also provides a slightly different current-driven circuit topology, one which does not require the auxiliary circuit to ensure ZVS for the leading-leg of the full-bridge inverter. The arrangement illustrated in FIG. 8 shows a series-parallel current-driven full-bridge DC/DC converter. This circuit is identical to the circuit in FIG. 2 with the exception that the auxiliary circuit 10 has been removed and an inductor $L_p$ is now placed in parallel to the transformer 140 on the transformer's side away from the series inductor $L_s$. This series-parallel current-driven full-bridge topology consists of a series branch including $L_s$ and a parallel branch including $L_p$ and $C_p$. When the PCM-SSOC control technique is applied to this circuit, it ensures that a square-wave voltage is always applied to the secondary side of the transformer. This voltage can be used to generate a reactive current for the leading-leg. In the arrangement shown in FIG. 8 the inductance $L_p$ is used to produce the reactive current, thereby eliminating the need for the auxiliary circuit.

Figure 9:
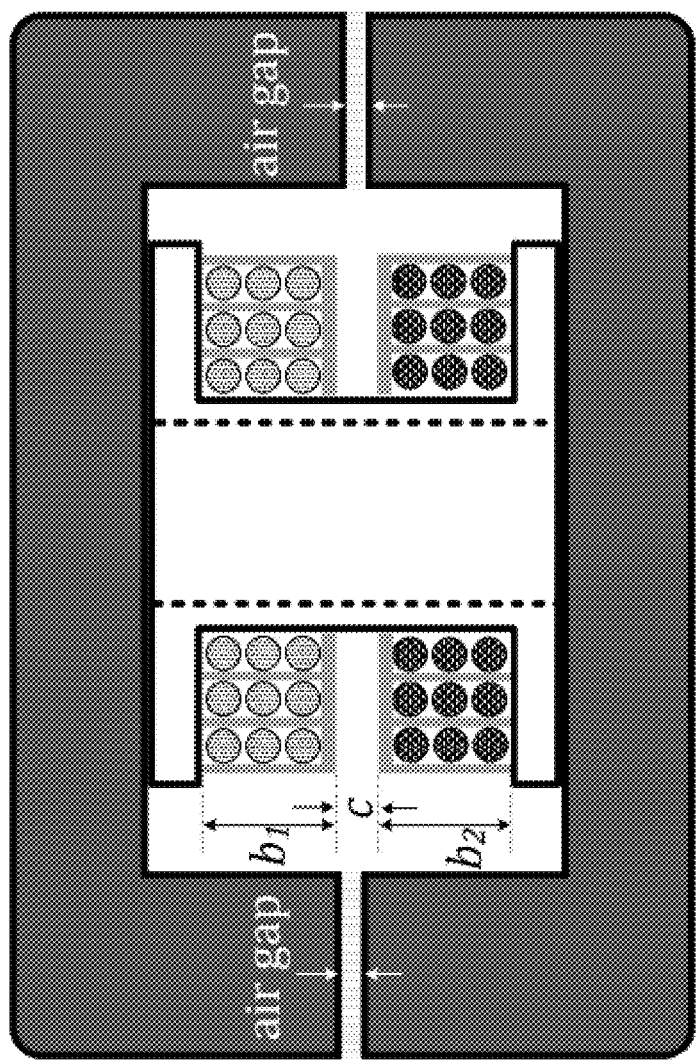
FIG. 9 illustrates an exemplary arrangement of a high-frequency transformer able to accommodate the inductances for the transformer used in the circuit of FIG. 8.

The parallel inductance, $L_p$, can easily be embedded in the high frequency transformer. According to FIG. 8, the high frequency transformer subcircuit 13, can be designed such that the leakage inductance is used as the series inductance $L_s$, and the magnetizing inductance is used as the parallel inductance $L_p$. The arrangement in FIG. 9 shows an exemplary arrangement of a high-frequency transformer which is able to accommodate the series inductance, $L_s$, and the parallel inductance, $L_p$. The series-parallel current-drive full-bridge topology can result in an efficient converter with a very high power density. This is due to the fact that this topology is able to absorb the parasitic components of the transformer and to use them to efficiently transfer power.

Referring to FIG. 8, it should be clear that when the parallel inductance current reaches series inductance current, the output diodes turn off. The energy stored in the series inductance as well as the energy stored in the parallel inductance, at that instant, is thus used to discharge the output capacitors of the leading-leg power semiconductors. Since the energy of the two inductances are used to discharge the output capacitors of the power semiconductors, a very small current is required to guarantee ZVS. In contrast, in conventional full-bridge converters, only the energy of the leakage inductance is used to provide ZVS. This causes conventional full-bridge converters to lose ZVS at light loads.

Figure 10:
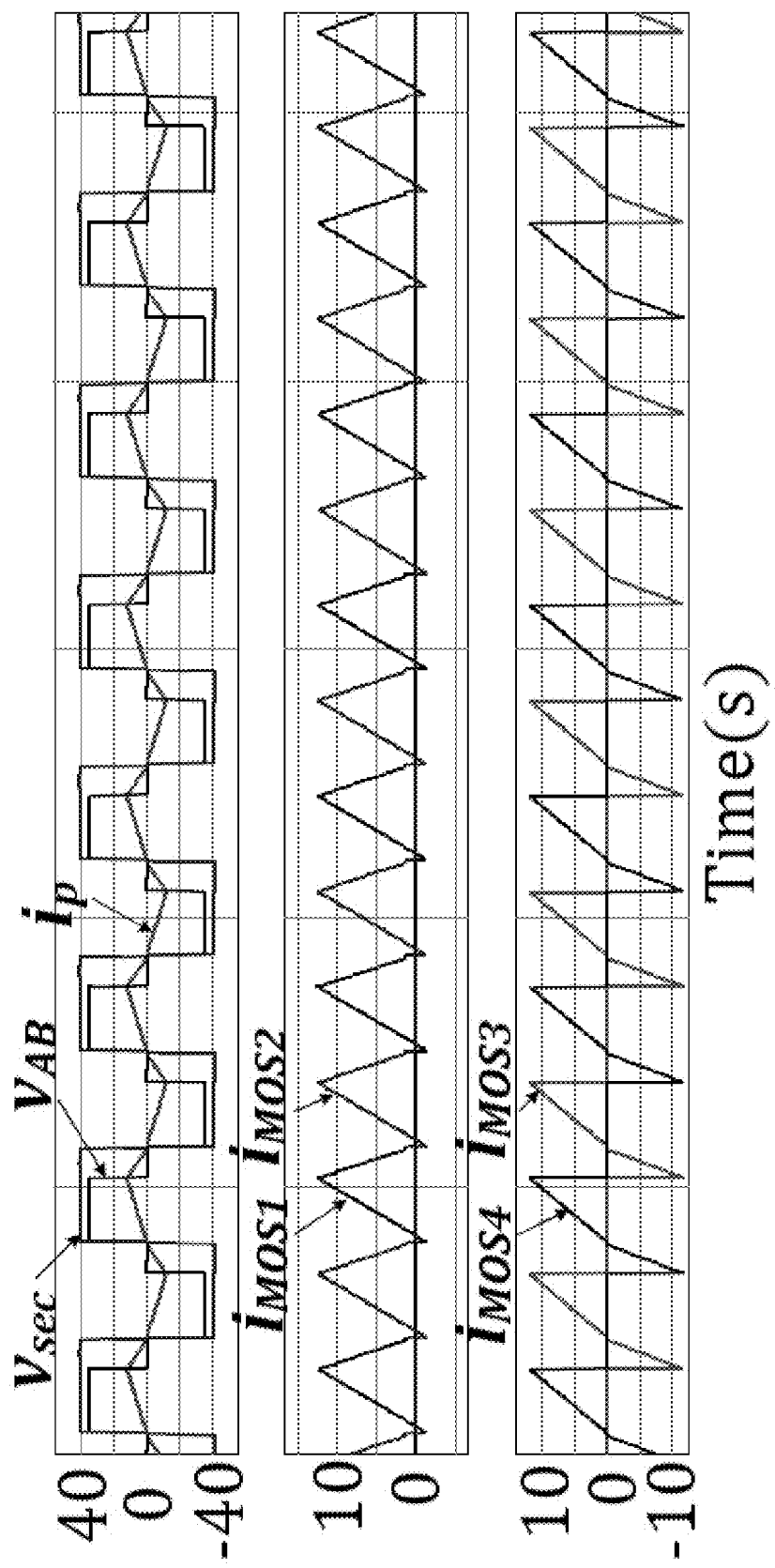
FIG. 10 show simulation results for the current-driven full-bridge DC/DC converter using the controller illustrated in FIG. 7.
Figure 11:
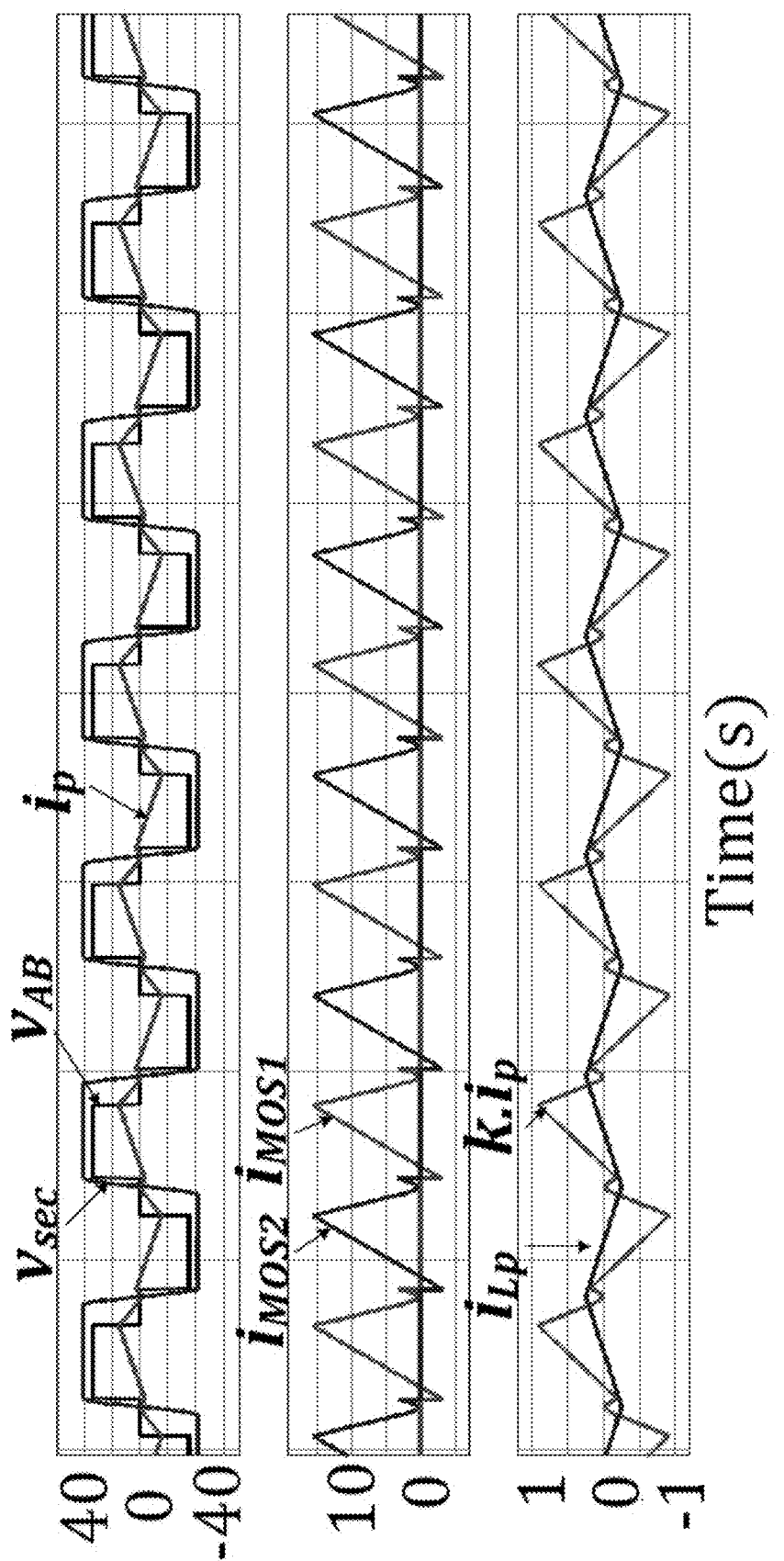
FIG. 11 shows simulation results for the converter configuration illustrated in FIG. 8.

In order to examine the performance of the current-driven topologies proposed in the present invention, a simulation was conducted. FIG. 10 shows the simulation results for the current-driven full-bridge DC/DC converter, with PCM-SSOC control system. FIG. 10 illustrates that the PCM-SSOC conrol technique ensures that the transformer output voltage and current are in phase and that the transformer output voltage is a square-wave waveform. Also, it can be seen that the auxiliary circuit provides ZVS for the leading-leg. FIG. 11 shows the simulation results for series-parallel current-driven full-bridge DC/DC converter. From FIG. 11 it can be seen that the parallel inductance $L_p$ provides ZVS current for the leading-leg and that, therefore, the parallel inductance eliminates the need for the auxiliary circuit.

Figure 12A:
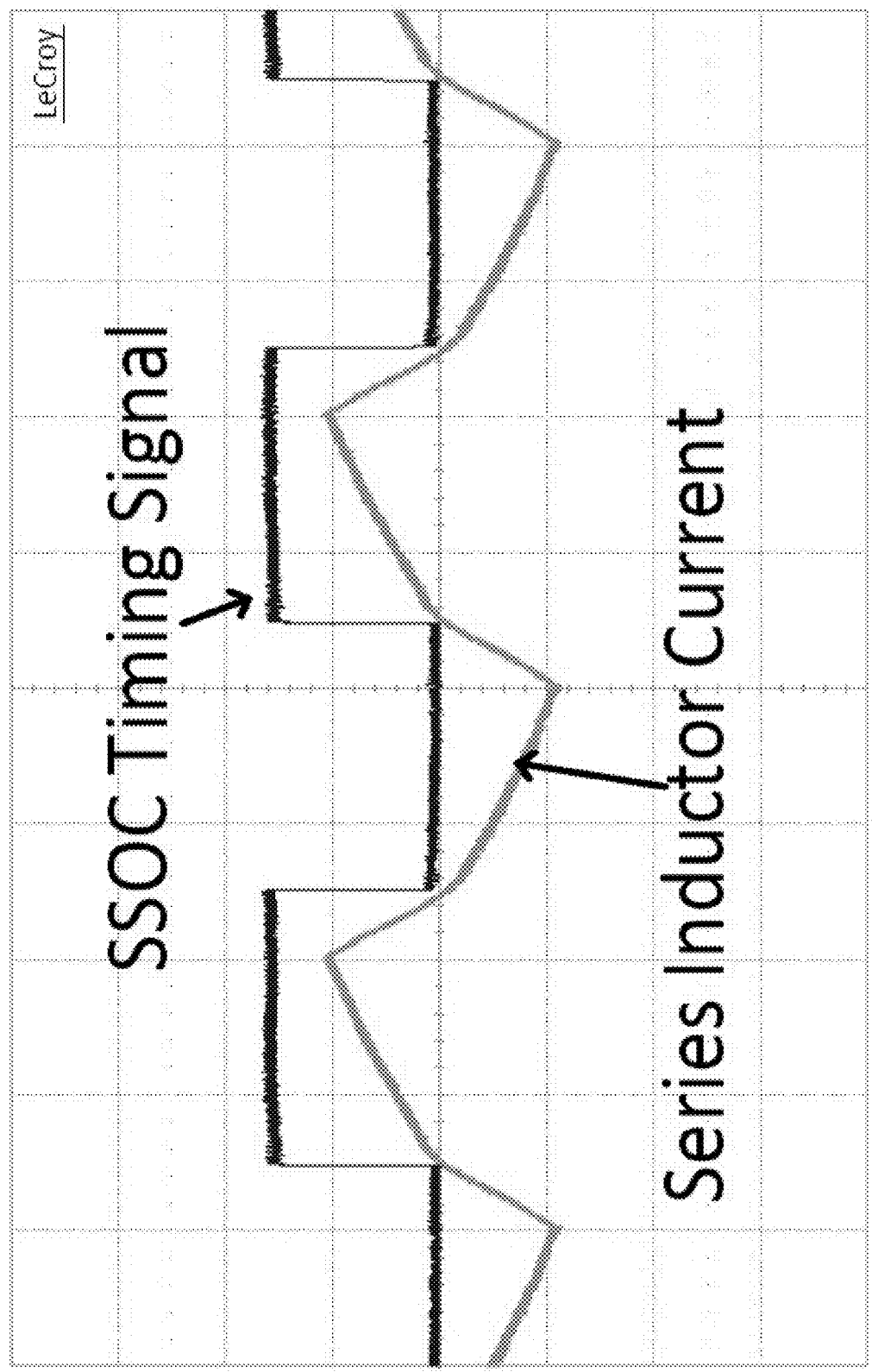
FIGS. 12A and 12B show the response of the series-parallel variant converter of FIG. 8 under light and heavy loads.
Figure 12B:
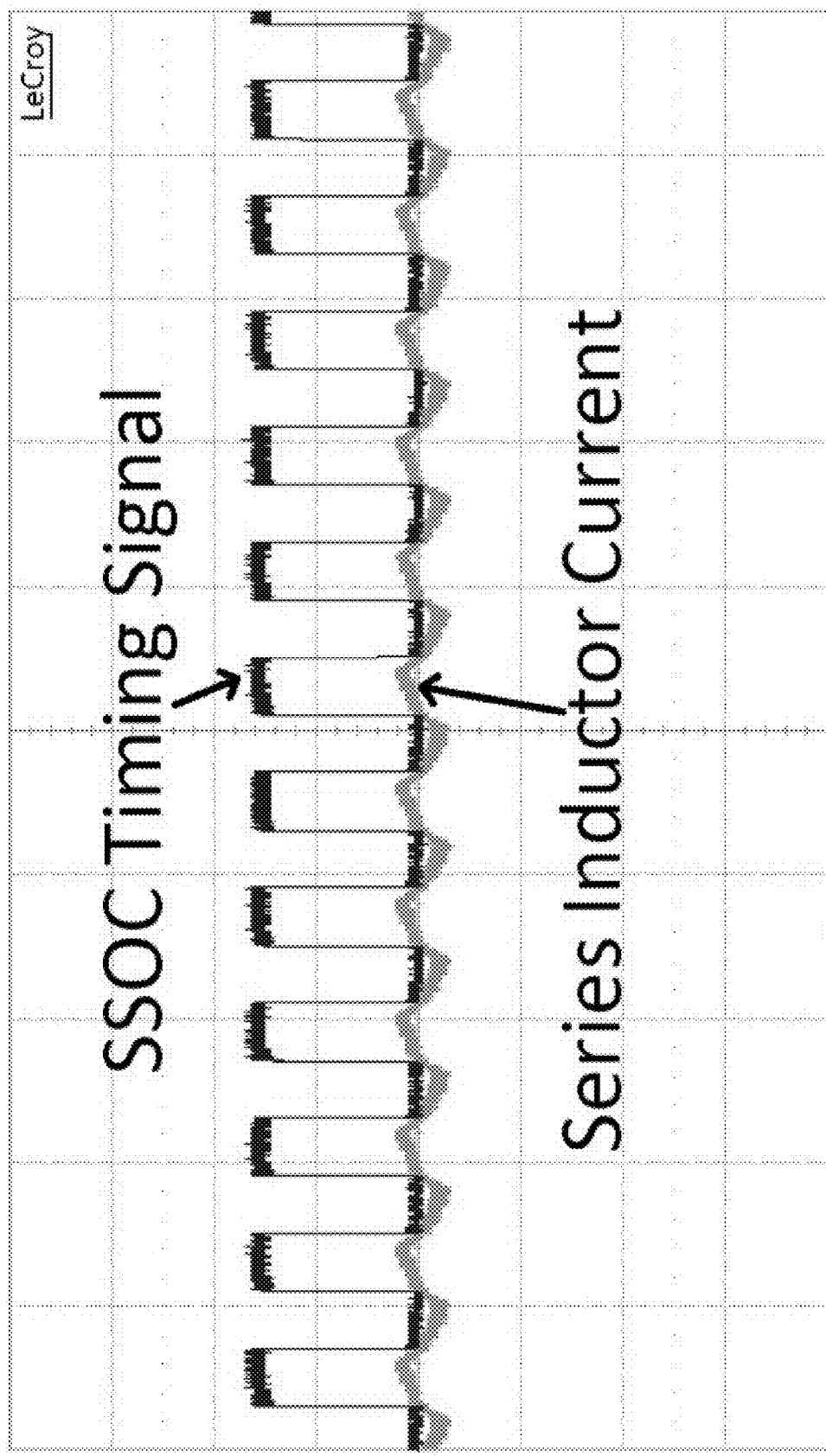
Figure 13:
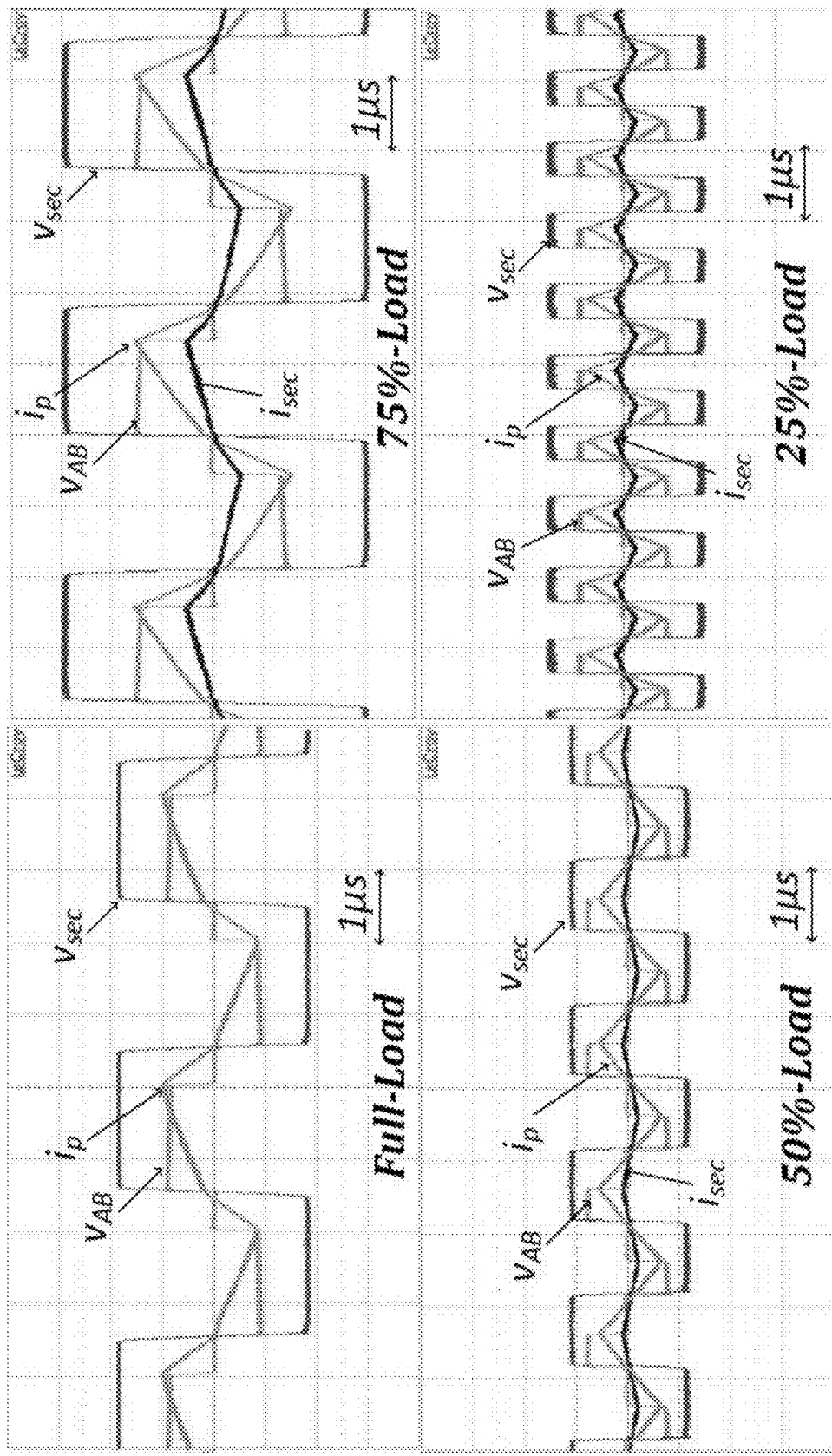
FIG. 13 shows the waveforms for the controller of FIG. 4 under four different loads.

The invention was implemented to verify the performance of the PCM-SSOC control technique of the invention. The SSOC modulator of the invention requires a circuitry which produces the timing signal based on the transformer primary current. Preferably, this signal is precisely synchronized with the primary current. FIGS. 12A and 12B show the response of this circuit for a heavy load and a light load. From FIGS. 12A and 12B, it can be seen that the SSOC timing circuitry extracts the timing information from the transformer primary current. FIGS. 12A and 12B also show that the PCM-SSOC technique adaptively changes the switching frequency based on the operating condition. FIG. 13 shows the waveforms of the PCM-SSOC control system for four different loads. From FIG. 13, it can be seen that the PCM-SSOC modulator adaptively controls the phase-shift and the switching frequency of the converter based on the operating condition. The control system maintains the transformer secondary voltage and the primary current in phase with each other in order to retain the optimal operating point of the converter. This allows the converter to utilize the entire switching cycle to process the power. Also, it can also be seen that the SSOC-PCM control scheme tries to maximize the duty ratio of the transformer secondary voltage in order to take advantage of the entire switching cycle to transfer power to the output.

A person understanding this invention may now conceive of alternative structures and embodiments or variations of the above all of which are intended to fall within the scope of the invention as defined in the claims that follow.

We claim:

1. A circuit for use as a DC/DC converter, the circuit comprising:
   a fullbridge subcircuit coupled in parallel to an input, said fullbridge subcircuit including a plurality of power semiconductors arranged in a bridge configuration;
   a high frequency transformer subcircuit coupled to said fullbridge subcircuit;
   a diode bridge subcircuit coupled to said transformer subcircuit;
   a parallel capacitor coupled in parallel to said diode bridge subcircuit;
   a subcircuit for providing reactive current for said power semiconductors for zero voltage switching of said semiconductors;
   wherein
   said parallel capacitor is coupled to an output of said converter;
   said subcircuit for providing reactive current is an inductor coupled in parallel to a transformer in said transformer subcircuit;
   said transformer subcircuit comprises a series inductor coupled in series between said transformer and an input from said full bridge subcircuit;
   wherein said diode bridge subcircuit comprises a first pair of diodes coupled in series and a second pair of diodes coupled in series, said first pair of diodes being coupled in parallel with said second pair of diodes, said transformer subcircuit being coupled to a first connection point between said first pair of diodes and to a second connection point between said second pair of diodes; and
   said inductor coupled in parallel to said transformer is coupled between said first connection point and said second connection point.

2. A circuit according to claim 1, wherein said full bridge subcircuit comprises a first pair of power semiconductors and a second pair of power semiconductors, said first pair of power semiconductors being in parallel with said second pair of power semiconductors.

3. A circuit according to claim 1, wherein said circuit is controlled by a controller which receives as input a transformer primary current from said transformer subcircuit, control signals for power semiconductors in said fullbridge subcircuit being derived from said primary transformer current.

4. A circuit according to claim 3, wherein said controller comprises:
- a modulator for producing control signals for said power semiconductors in said full-bridge subcircuit;
- a subcontroller for providing a timing signal to said modulator;

wherein
- both said subcontroller and said modulator receive as input a version of said transformer primary current; and
- said subcontroller receives as input an output of a maximum power point tracking module coupled to an input power source.

5. A circuit according to claim 4, wherein said input power source is a photovoltaic panel.

6. A controller for controlling a DC/DC converter circuit, said controller comprising:
- a modulator for producing control signals for power semiconductors in said converter circuit;
- a subcontroller for providing a timing signal to said modulator;

wherein
- both said subcontroller and said modulator receive as input a version of a transformer primary current from a transformer in said converter circuit;
- said subcontroller receives as input an output of a maximum power point tracking module coupled to an input power source; and
- said DC/DC converter circuit comprises: a subcircuit for providing reactive current for power semiconductors in said converter circuit, said reactive current being for zero voltage switching of said semiconductors, said subcircuit for providing reactive current being an inductor coupled in parallel to a transformer in a transformer subcircuit of said converter circuit;
- said DC/DC converter circuit further comprising a diode bridge subcircuit coupled to said transformer at a first connection point in one arm of said diode bridge subcircuit and a second connection point in another arm of said diode bridge subcircuit, said inductor coupled in parallel to said transformer being coupled between said first connection point and said second connection point.

7. A controller according to claim 6, wherein said input power source is a photovoltaic panel.

8. A controller according to claim 6, wherein said converter circuit further comprises:
- a fullbridge subcircuit coupled in parallel to an input, said fullbridge subcircuit including a plurality of power semiconductors arranged in a bridge configuration;
- a parallel capacitor coupled in parallel to said diode bridge subcircuit;

wherein
- said transformer subcircuit is coupled to said fullbridge subcircuit;
- said parallel capacitor is coupled to an output of said converter.

* * * * *